B. B. Choate,
Mop-Wringer.
N° 77,355.  Patented Apr. 28, 1868.
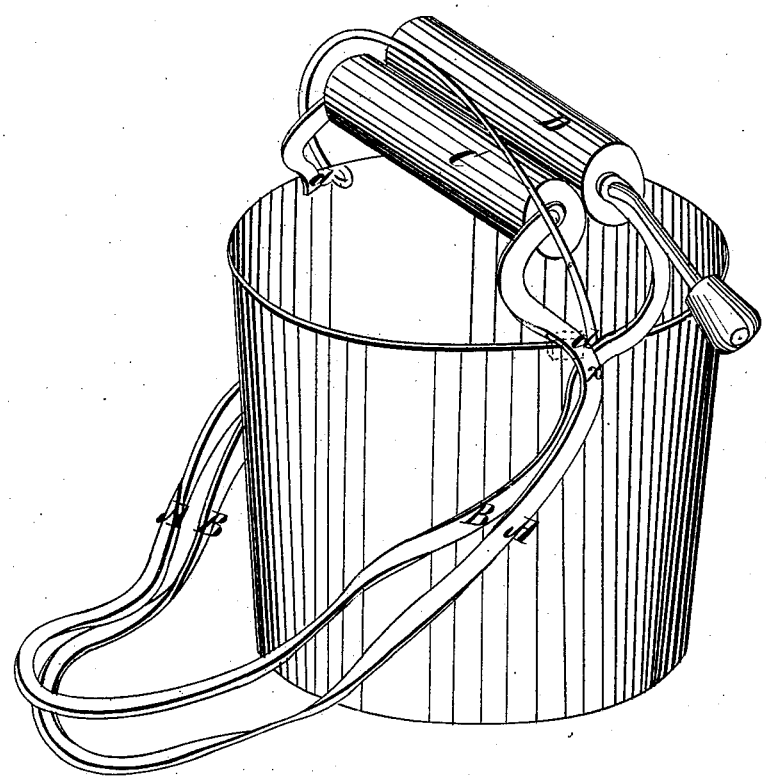
Witnesses:  Inventor:

United States Patent Office.

B. B. CHOATE, OF SPRINGFIELD, VERMONT.

Letters Patent No. 77,355, dated April 28, 1868.

IMPROVED MOP-WRINGER.

*The Schedule referred to in these Letters Patent and making part of the same.*

TO ALL WHOM IT MAY CONCERN:

Be it known that I, B. B. CHOATE, of Springfield, in the county of Windsor, and in the State of Vermont, have invented certain new and useful Improvements in Mop-Wringers; and do hereby declare that the following is a full, clear, and exact description thereof, reference being had to the accompanying drawings, and to the letters of reference marked thereon.

In the annexed drawings, making part of this specification, A and B represent two metallic bars, which are bent at their centres, in the line of their edges, nearly double, and then have their edges and sides curved or bent, in the manner represented in the drawings. These bars are pivoted together, as seen at $x\ x$, a short distance from their ends, and between their ends are placed the rollers C and D. The rollers have axles, which have bearings in the ends of the bars, holes being made in said bars for receiving the axles. The centres of the bars are so formed as to answer as foot-pieces, upon which the operator may place his foot in bearing the rollers together. When the foot-pieces at the centres of the bars are separated, the rollers, of course, separate at the same time, so that a mop may be placed between them. When the foot-pieces are closed toward each other, the rollers close upon the mop, and press it as tightly as may be desirable for wringing the water, &c., from it.

Upon the inner sides of the bar A, above the point where the two bars are pivoted together, are secured the hooks or catches $d\ d$.

The bars A and B are spread wide enough apart at a point just above their pivots that they embrace an ordinary water or mop-pail on opposite sides, the hooks $d\ d$ catching upon the edges of the pail, so as to support the bars and keep them in position. Upon one of the shafts of the rollers is secured a crank-handle for revolving or giving motion to them.

The operator stands over the bucket and operates one of the bars with his foot, while he turns the rollers with his hand by means of the crank-handle. The bar A will remain stationary, while the other, B, can be raised or lowered, so as to separate or close the rollers. The mop is pressed and drawn between the rollers in the usual manner.

Having thus fully described my invention, what I claim as new, and desire to secure by Letters Patent, is—

The bars A and B, pivoted together, and curved as represented, bar A being provided with the hooks $d\ d$, and the two used in combination with the rollers C and D and a mop-pail, as and for the purpose set forth.

In testimony that I claim the foregoing, I have hereunto set my hand, this 10th day of February, 1868.

B. B. CHOATE.

Witnesses:
HENRY CLOSSON,
GERSHOM L. CLOSSON.